Figure 1:
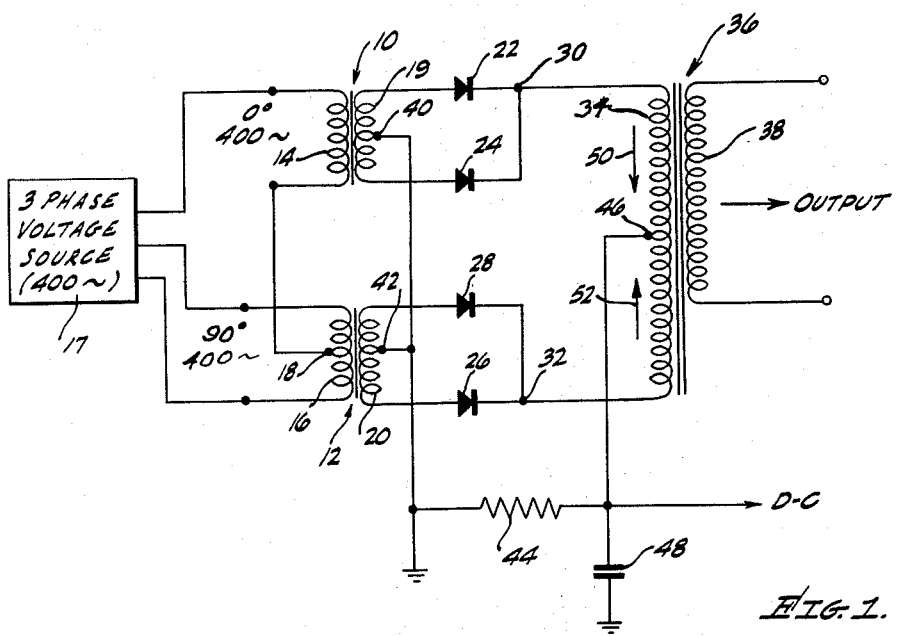

Jan. 6, 1959    R. T. HENSZEY    2,867,731
LINE FREQUENCY DOUBLER

Filed Dec. 28, 1956    2 Sheets-Sheet 1

INVENTOR.
ROBERT T. HENSZEY,
BY
Perry E. Turner
AGENT.

Jan. 6, 1959  R. T. HENSZEY  2,867,731
LINE FREQUENCY DOUBLER
Filed Dec. 28, 1956  2 Sheets-Sheet 2

INVENTOR.
ROBERT T. HENSZEY,
BY
Perry E. Turner
AGENT.

United States Patent Office 2,867,731
Patented Jan. 6, 1959

2,867,731

LINE FREQUENCY DOUBLER

Robert T. Henszey, Los Angeles, Calif., assignor to Lear, Incorporated

Application December 28, 1956, Serial No. 631,314

3 Claims. (Cl. 307—11)

This invention relates to frequency doubler circuits, and more particularly to means for developing a cyclical reference voltage of twice the frequency of a source voltage without resort to filter networks.

In many electronic systems, frequency doubling is accomplished by full wave rectification of a source of line voltage, as by applying the line voltage to a full-wave rectifier, followed by filtering and transformer action to obtain an output of the ripple frequency of the rectified voltage. The filtering is necessary in order to remove the D.-C. component in the rectified voltage, and to develop a substantially smooth cyclical voltage to be applied to the transformer. Although the ripple frequency is the desired frequency, the filtering results in variations in phase relation between the output and source voltages with changes in the frequency of the source voltage.

It is an object of this invention to provide a frequency doubler circuit which utilizes no filter network, in which a constant phase relation is maintained between output and line voltages.

It is a further object of this invention to provide a frequency doubler for a line voltage, from which a smoother D.-C. voltage may be extracted than is possible with prior art frequency doublers.

It is still a further object of this invention to provide a frequency doubler network comprising a minimum number of component parts of simple design, which is lighter in weight and occupies less space than similar prior art networks.

Briefly, this invention comprises means responsive to a sinusoidal line voltage to develop two full-wave rectified voltages which are 90° out of phase, and means for deriving a voltage representing their difference. The resulting voltage approximates a triangular wave of double the line frequency.

The above and other objects and advantages of this invention will be apparent from the following description, taken in conjunction with the accompanying drawings, in which different embodiments of the invention are illustrated by way of example. The scope of the invention is pointed out in the appended claims.

Figure 2:
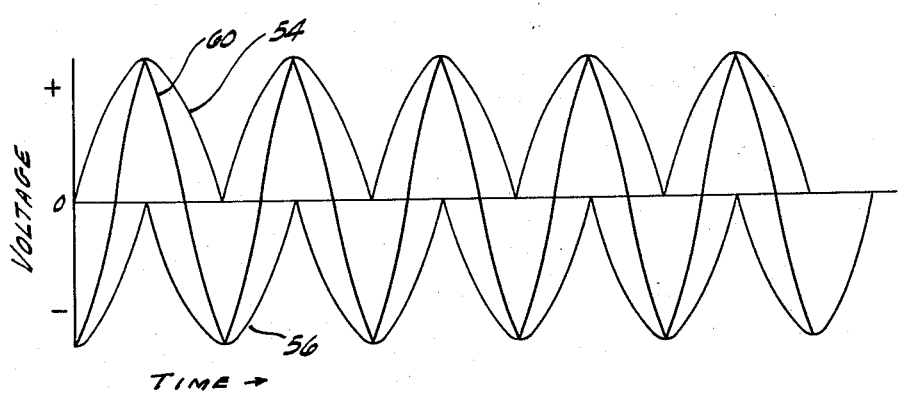
Figure 3:
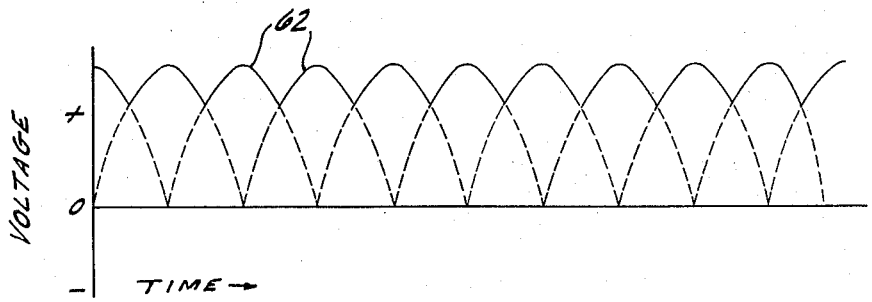
Figure 4:
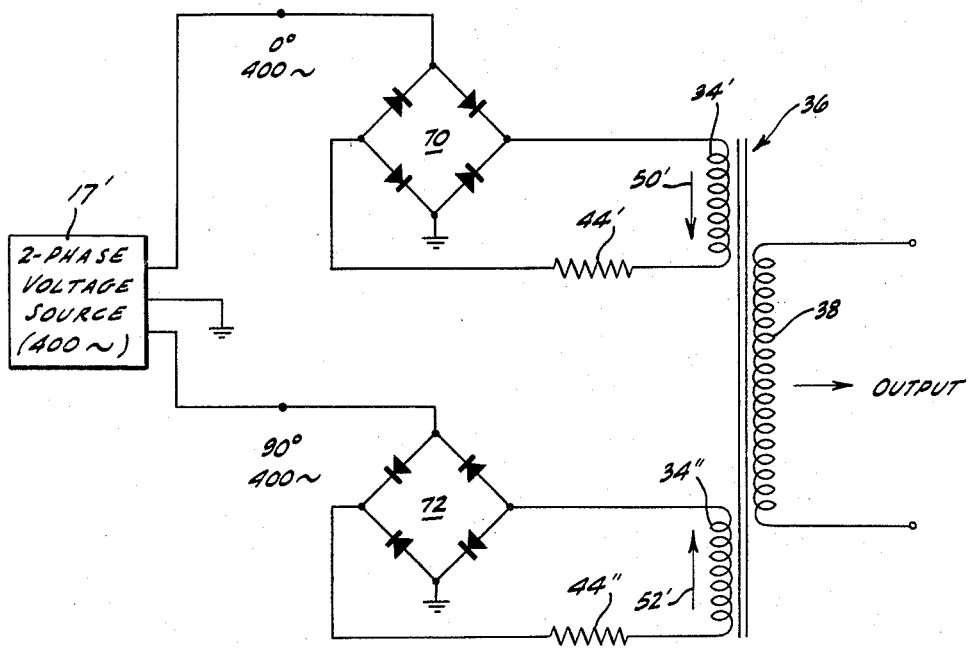

Referring to the drawing,

Fig. 1 is a schematic diagram of a frequency doubler network in accordance with this invention, Fig. 2 illustrates waveforms to aid in explaining the frequency doubling operation of the circuit of Fig. 1, Fig. 3 illustrates waveforms to aid in explaining the D.-C. voltage obtained with the circuit of Fig. 1, and Fig. 4 is a schematic diagram of a modified form of frequency doubler, further in accordance with this invention.

Referring to Fig. 1, two transformers 10, 12 have respective primary windings 14, 16 adapted to be coupled to a source 17 of cyclical voltage of predetermined frequency, e. g. 400 C. P. S. As indicated, and in accordance with this invention, the voltage applied to one primary winding 16 is 90° out of phase with respect to the voltage appearing across the other primary winding 14. To effect this phase relation, any suitable phase delay means may be employed; however, such phase delay means preferably is insensitive to frequency changes in the voltage of source 17. If source 17 as indicated is a three-phase source, the desired phase delay may be effected by interconnecting primary windings in the well-known Scott connection, wherein the center-tap 18 of one primary 16 is connected to one terminal of the other primary 14, with respective connections from the three leads from source 17 to the terminals of primary 16 and the remaining terminal 14. With such an arrangement, as is well known, the voltages appearing across primary windings 14, 16 will be 90° out of phase at any frequency.

Secondary windings 19, 20 of the transformers 10, 12 have respective pairs of rectifiers, illustrated as diodes 22—24 and 26—28, connected across their end terminals and to respective common junctions 30, 32, thereby to provide two full-wave rectifiers. Junctions 30, 32 are connected to the end terminals of the primary winding 34 of transformer 36, across the secondary winding 38 of which output voltages appear.

The secondary windings 19, 20 have their center-taps 40 and 42 connected to reference or ground potential, and a resistive connection, represented by a resistor 44, is made between the center-tap 46 of primary winding 34 and ground. Resistor 44 serves as a current limiting device and determines the magnitude of the power output across secondary winding 38. It will be evident, however, that resistor 44 can be eliminated if the resistances of secondary windings 19, 20 and primary winding 34 are sufficient for current limiting purposes.

A capacitor 48 is connected between center-tap 46 and ground. Capacitor 48 forms a filter for smoothing the D.-C. voltage to be applied to a D.-C. load, as will be more fully explained hereinafter.

The operation of the circuit of Fig. 1 will now be described with reference to Fig. 2.

As previously mentioned, secondary windings 19, 20 and their associated diodes 22—24, 26—28 provide two full-wave rectifiers. The halves of primary winding 34 and resistor 44 constitute loads in the respective full-wave rectifier circuits, and currents flow through these halves in opposite directions, as indicated by arrows 50, 52. The resultant transformer action can be illustrated, as shown in Fig. 2, by respective full-wave rectified voltages 54, 56 of which are of opposite polarity, and displaced 90°. The output voltage appearing across secondary winding 38 is the difference between rectified voltages 54, 56. As illustrated, the resultant voltage 60 is of substantially triangular wave shape, its frequency is twice that of the input voltage (800 C. P. S. in the present example), and its amplitude is twice that of either voltage 54, 56.

It is noted that, by comparison with standard non-sinusoidal waveforms (e. g., square, trapezoidal and triangular), the voltage 60 developed by the circuit of this invention is a fairly good approximation to a sine wave. A Fourier analysis of standard non-sinusoidal waveforms shows that the pure triangular wave contains the least amount of undesired harmonics. However, it can also be shown by Fourier analysis that the voltage developed by this invention has a smaller harmonic content than does a pure triangular wave. Such a voltage is suitable as a reference voltage for a signal circuit (e. g., a discriminator to minimize the likelihood that undesired harmonics in applied signals are transferred to other circuits of a system).

Since no filters are employed as in prior art circuits, no variable phase shift problem exists. The phase relation between the output voltage wave 60 and the line voltage remains constant.

Referring to Fig. 3, the circuit of this invention, by virtue of the phase difference between the two full-wave rectified voltages, establishes across resistor 44 a voltage 62 having a ripple frequency of twice the frequency of the output voltage (or 1600 C. P. S. in the present example). This contrasts sharply with prior art line frequency doublers, wherein extracted D.-C. voltages have a ripple frequency of the same frequency as the output voltage. An advantage which is realized here is that a smooth D.-C. voltage can be obtained with a capacitor 48 of substantially half the size of capacitor used in prior art doubler circuits.

If the D.-C. voltage is not desired, capacitor 48 can be eliminated, as well as the ground connection for center-taps 40, 42.

Fig. 4 illustrates another arrangement to obtain the approximate triangular wave of Fig. 2. Referring to Fig. 4, two full-wave bridge rectifier circuits 70, 72 are employed. Again, the line voltages applied to rectifier circuits 70, 72 are 90° out of phase. The voltage source 17' in this embodiment is illustrated as a two-phase source. To effect the desired phase delay regardless of frequency, the rectifier circuits are connected between the respective phase leads and reference or ground potential, as shown. The output transformer 36 in this embodiment has separate primary windings 34', 34" and respective series resistors 44', 44" connected between the output leads of rectifiers 70, 72. With the bridge circuits arranged as shown, the current paths in the primary windings 34', 34" are in opposite directions, as indicated by arrows 50', 52' and the same voltage waveform appears across secondary winding 38 as in the embodiment of Fig. 1.

It should be noted that the circuits of Figs. 1 and 4 could also be supplied by a single-phase source, with a device to provide phase splitting or a phase shift coupled between the source and one of the primary windings 10, 12 (Fig. 1) or one of the rectifiers 70, 72 (Fig. 4). This arrangement appears obvious, the only drawback being that it is not insensitive to frequency changes. However, this would not be objectionable with a single-phase source of constant frequency output.

It will be apparent from the foregoing that, if no D.-C. voltage is to be extracted in the circuit of Fig. 1, separate primary windings can be employed in that circuit in the manner shown in Fig. 4. Further, any full-wave rectifier circuits may be employed for the purposes of this invention.

What is claimed is:

1. A line frequency doubler comprising first and second full-wave rectifier circuits, means to apply to said rectifier circuits respective sinusoidal voltages of the same frequency and amplitude, said last named means delaying the voltage applied to one of said rectifier circuits 90° with respect to the other, and means responsive to said rectified voltages to develop an output voltage wave which represents the difference between said rectified voltages including a transformer having first and second primary windings connected respectively to said first and second rectifier circuits.

2. A line frequency doubler comprising a two-phase voltage source, respective full-wave rectifier circuits connected to said source, an output transformer having a secondary and a pair of primary windings, and said rectifier circuits being connected respectively to the primary windings of said output transformer.

3. A line frequency doubler comprising first and second input transformers each having a primary winding and a secondary winding, an output transformer having two primary windings and a secondary winding, respective full-wave rectifiers connected between the secondary windings of said input transformers and the primary windings of said output transformer, said rectifiers being arranged to effect current flow in opposite directions through the primary windings of said output transformer, and means to apply respective cyclical voltages having a 90° phase difference to the primary windings of said first and second input transformers.

References Cited in the file of this patent

UNITED STATES PATENTS

| | | |
|---|---|---|
| 1,394,325 | Meyer | Oct. 18, 1921 |
| 2,440,465 | Ferguson | Apr. 27, 1948 |